(12) United States Patent
Wnuk et al.

(10) Patent No.: US 11,380,080 B2
(45) Date of Patent: *Jul. 5, 2022

(54) OBJECT INGESTION THROUGH CANONICAL SHAPES, SYSTEMS AND METHODS

(71) Applicant: Nant Holdings IP, LLC, Culver City, CA (US)

(72) Inventors: Kamil Wnuk, Playa del Rey, CA (US); David McKinnon, San Francisco, CA (US); Jeremi Sudol, New York, NY (US); Bing Song, La Canada, CA (US); Matheen Siddiqui, Culver City, CA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/040,000

(22) Filed: Sep. 30, 2020

(65) Prior Publication Data

US 2021/0027084 A1 Jan. 28, 2021

Related U.S. Application Data

(63) Continuation of application No. 16/123,764, filed on Sep. 6, 2018, now Pat. No. 10,832,075, which is a continuation of application No. 15/297,053, filed on Oct. 18, 2016, now Pat. No. 10,095,945, which is a continuation of application No. 14/623,435, filed on Feb. 16, 2015, now Pat. No. 9,501,498.

(60) Provisional application No. 61/940,320, filed on Feb. 14, 2014.

(51) Int. Cl.
*G06V 10/20* (2022.01)
*G06F 16/532* (2019.01)
(Continued)

(52) U.S. Cl.
CPC .......... *G06V 10/255* (2022.01); *G06F 16/532* (2019.01); *G06F 16/5838* (2019.01);
(Continued)

(58) Field of Classification Search
CPC ............. G06K 9/00744; G06K 9/4609; G06K 9/3241; G06K 9/00201; G06F 17/30256;
(Continued)

(56) References Cited

U.S. PATENT DOCUMENTS 5,581,634 A 12/1996 Heide
6,173,066 B1 1/2001 Peurach et al.
(Continued)

FOREIGN PATENT DOCUMENTS

CN 1451128 A 10/2003
GB 2486237 A 8/2012
(Continued)

OTHER PUBLICATIONS

Chen et al., "3-Sweep: Extracting Editable Objects from a Single Photo," Proceedings of ACM SIGGRAPH Asia 2013, vol. 32, Issue 6, Nov. 2013, 10 pages.
(Continued)

*Primary Examiner* — Utpal D Shah
(74) *Attorney, Agent, or Firm* — Mauriel Kapouytian Woods LLP; Elaine K. Lee; Andrew A. Noble

(57) ABSTRACT

An object recognition ingestion system is presented. The object ingestion system captures image data of objects, possibly in an uncontrolled setting. The image data is analyzed to determine if one or more a priori know canonical shape objects match the object represented in the image data. The canonical shape object also includes one or more reference PoVs indicating perspectives from which to analyze objects having the corresponding shape. An object ingestion engine combines the canonical shape object along with the image data to create a model of the object. The engine generates a desirable set of model PoVs from the reference PoVs, and then generates recognition descriptors from each of the model PoVs. The descriptors, image data,
(Continued)

model PoVs, or other contextually relevant information are combined into key frame bundles having sufficient information to allow other computing devices to recognize the object at a later time.

23 Claims, 3 Drawing Sheets

(51) Int. Cl.
　　*G06F 16/583* (2019.01)
　　*G06T 7/13* (2017.01)
　　*G06V 10/44* (2022.01)
　　*G06V 20/40* (2022.01)
　　*G06F 16/58* (2019.01)
　　*G06V 20/64* (2022.01)
　　*G06T 7/60* (2017.01)

(52) U.S. Cl.
　　CPC ...... *G06F 16/5854* (2019.01); *G06F 16/5866* (2019.01); *G06T 7/13* (2017.01); *G06T 7/60* (2013.01); *G06V 10/443* (2022.01); *G06V 20/46* (2022.01); *G06V 20/64* (2022.01); *G06T 2207/20061* (2013.01); *G06T 2207/20116* (2013.01)

(58) Field of Classification Search
　　CPC ......... G06F 17/30277; G06F 17/30259; G06F 16/5838; G06F 16/5854; G06F 16/5866; G06F 16/532; G06T 7/60; G06T 7/0085; G06T 7/13; G06V 10/255; G06V 10/443; G06V 20/64; G06V 20/46
　　See application file for complete search history.

(56) References Cited

U.S. PATENT DOCUMENTS

| | | | |
|---|---|---|---|
| 6,400,996 B1 | 6/2002 | Hoffberg et al. | |
| 6,463,176 B1 | 10/2002 | Matsugu et al. | |
| 6,711,293 B1 | 3/2004 | Lowe | |
| 6,728,392 B1 | 4/2004 | Joshi | |
| 6,907,140 B2 | 6/2005 | Matsugu et al. | |
| 7,016,532 B2 | 3/2006 | Boncyk et al. | |
| 7,171,060 B2 | 1/2007 | Park et al. | |
| 7,343,039 B2 | 3/2008 | Liu et al. | |
| 7,412,427 B2 | 8/2008 | Zitnick et al. | |
| 7,477,780 B2 | 1/2009 | Boncyk et al. | |
| 7,565,008 B2 | 7/2009 | Boncyk et al. | |
| 7,623,685 B2 | 11/2009 | Boult et al. | |
| 7,643,683 B2 * | 1/2010 | Miller | G06K 9/00208 |
| | | | 382/190 |
| 7,680,324 B2 | 3/2010 | Boncyk et al. | |
| 7,765,231 B2 | 7/2010 | Rathus et al. | |
| 7,809,193 B2 | 10/2010 | Iwasaki et al. | |
| 7,813,822 B1 | 10/2010 | Hoffberg | |
| 7,929,775 B2 | 4/2011 | Hager et al. | |
| 7,974,714 B2 | 7/2011 | Hoffberg | |
| 8,108,408 B2 | 1/2012 | Kondo et al. | |
| 8,165,916 B2 | 4/2012 | Hoffberg et al. | |
| 8,170,340 B2 | 5/2012 | Klefenz | |
| 8,429,174 B2 | 4/2013 | Ramani et al. | |
| 8,463,006 B2 | 6/2013 | Prokoski | |
| 8,494,227 B2 | 7/2013 | Prokoski | |
| 8,515,890 B2 | 8/2013 | Zadeh | |
| 8,532,368 B2 | 9/2013 | Se et al. | |
| 8,538,064 B2 | 9/2013 | Rhoads et al. | |
| 8,605,141 B2 | 12/2013 | Dialameh et al. | |
| 8,606,021 B2 | 12/2013 | Conwell | |
| 8,630,513 B2 | 1/2014 | Gokturk et al. | |
| 9,177,245 B2 | 11/2015 | Richert et al. | |
| 9,355,123 B2 | 5/2016 | Wnuk et al. | |
| 9,501,498 B2 | 11/2016 | Wnuk et al. | |
| 9,508,009 B2 | 11/2016 | Wnuk et al. | |
| 9,690,991 B2 | 6/2017 | Wnuk et al. | |
| 9,904,850 B2 | 2/2018 | Wnuk et al. | |
| 10,095,945 B2 | 10/2018 | Wnuk et al. | |
| 10,832,075 B2 | 11/2020 | Wnuk et al. | |
| 2002/0001398 A1* | 1/2002 | Shimano | G06K 9/6293 |
| | | | 382/104 |
| 2005/0069207 A1 | 3/2005 | Zakrzewski et al. | |
| 2005/0168460 A1 | 8/2005 | Razdan et al. | |
| 2005/0286767 A1 | 12/2005 | Hager et al. | |
| 2006/0122999 A1 | 6/2006 | Sosnov et al. | |
| 2006/0126943 A1 | 6/2006 | Simon et al. | |
| 2008/0103734 A1 | 5/2008 | Kobayashi | |
| 2008/0141181 A1 | 6/2008 | Ishigaki et al. | |
| 2009/0103814 A1* | 4/2009 | Nakamura | G06K 9/6203 |
| | | | 382/201 |
| 2010/0092093 A1 | 4/2010 | Akatsuka et al. | |
| 2010/0166294 A1 | 7/2010 | Marrion et al. | |
| 2010/0189313 A1 | 7/2010 | Prokoski | |
| 2010/0286827 A1* | 11/2010 | Franzius | G06K 9/00201 |
| | | | 700/259 |
| 2011/0043628 A1 | 2/2011 | Yun | |
| 2011/0081048 A1 | 4/2011 | Woo et al. | |
| 2011/0081081 A1* | 4/2011 | Smith | G06K 9/00818 |
| | | | 382/170 |
| 2011/0216090 A1 | 9/2011 | Woo et al. | |
| 2011/0244919 A1 | 10/2011 | Aller et al. | |
| 2011/0286628 A1 | 11/2011 | Goncalves et al. | |
| 2012/0128250 A1 | 5/2012 | Petrou et al. | |
| 2012/0163672 A1 | 6/2012 | McKinnon | |
| 2012/0281969 A1 | 11/2012 | Jiang et al. | |
| 2013/0170711 A1 | 7/2013 | Chigos et al. | |
| 2013/0187905 A1 | 7/2013 | Vaddadi et al. | |
| 2013/0212505 A1 | 8/2013 | Herold | |
| 2013/0247083 A1 | 9/2013 | Impollonia et al. | |
| 2013/0266195 A1 | 10/2013 | Shiell et al. | |
| 2013/0273968 A1 | 10/2013 | Rhoads et al. | |
| 2013/0290502 A1 | 10/2013 | Bilobrov et al. | |
| 2013/0293539 A1 | 11/2013 | Hunt et al. | |
| 2013/0295894 A1 | 11/2013 | Rhoads et al. | |
| 2013/0325202 A1 | 12/2013 | Howard et al. | |
| 2013/0329943 A1 | 12/2013 | Christopulos et al. | |
| 2013/0336554 A1 | 12/2013 | Lewis et al. | |
| 2014/0003668 A1 | 1/2014 | Boncyk et al. | |
| 2015/0139535 A1 | 5/2015 | Siddiqui | |
| 2015/0193972 A1* | 7/2015 | Algreatly | G06F 16/00 |
| | | | 345/420 |
| 2015/0261803 A1 | 9/2015 | Song et al. | |
| 2015/0302027 A1* | 10/2015 | Wnuk | G06F 16/5854 |
| | | | 382/305 |
| 2015/0324998 A1 | 11/2015 | Song et al. | |
| 2018/0165519 A1 | 6/2018 | Wnuk et al. | |

FOREIGN PATENT DOCUMENTS

| | | |
|---|---|---|
| JP | 2000-241141 A | 9/2000 |
| WO | 2007/038680 A2 | 4/2007 |
| WO | 2009/069071 A1 | 6/2009 |
| WO | 2010/052874 A1 | 5/2010 |
| WO | 2010/124356 A1 | 11/2010 |
| WO | 2011/069021 A2 | 6/2011 |
| WO | 2012/110828 A1 | 8/2012 |
| WO | 2013/082289 A1 | 6/2013 |

OTHER PUBLICATIONS

Silpa-Anan et al., "Optimised KD-trees for Fast Image Descriptor Matching," Computer Vision and Pattern Recognition, CVPR 2008, 8 pages.

Kurz et al., "Inertial sensor-aligned visual feature descriptors," Computer Vision and Pattern Recognition (CVPR), 2011, pp. 161-166.

Kurz et al., "Gravity-Aware Handheld Augmented Reality," IEEE and ACM International Symposium on Mixed and Augmented Reality (ISMAR2011), 10 pages.

Ozuysal et al., "Fast Keypoint Recognition in Ten Lines of Code," 2007 IEEE Conference on Computer Vision and Pattern Recognition, 8 pages.

(56) References Cited

OTHER PUBLICATIONS

International Search Report and Written Opinion for International Application No. PCT/US2015/016069 dated May 29, 2015, 14 pages.
Trzcinski et al., "Boosting Binary Keypoint Descriptors," CVPR '13 Proceedings of the 2013 IEEE Conference on Computer Vision and Pattern Recognition, 8 pages.
Lillywhite et al., "A feature construction method for general object recognition," Pattern Recognition, vol. 46, Issue 12, Dec. 2013, pp. 3300-3314.
Leutenegger et al., "BRISK: Binary Robust Invariant Scalable Keypoints," ICCV '11 Proceedings of the 2011 International Conference on Computer Vision, 8 pages.
Alahi et al., "FREAK: Fast Retina Keypoint," Computer Vision and Pattern Recognition (CVPR), 2012, 8 pages.
Liu et al., "An Investigation of Practical Approximate Nearest Neighbor Algorithms," Advances in Neural Information Processing Systems, 2004, 8 pages.
"Texton," UCLA, http://vcla.stat.ucla.edu/old/chengen_research/texton.htm, 4 pages.
International Preliminary Report on Patentability for International Application No. PCT/US2015/016069 dated Jun. 8, 2016, 7 pages.
First Office Action issued in Chinese Application No. 201580020006.8 dated Nov. 14, 2018, 20 pages.
Office Action issued in Chinese Patent Application No. 201580020006.8 dated May 14, 2019, 10 pages.

* cited by examiner

OBJECT INGESTION THROUGH CANONICAL SHAPES, SYSTEMS AND METHODS

This application is a continuation of U.S. application serial No. 16/123,764, filed on Sep. 6, 2018, which is a continuation of U.S. application serial No. 15/297,053, filed on Oct. 18, 2016, which is a continuation of U.S. application serial No. 14/623,435, filed on Feb. 16, 2015, which claims priority to U.S. Provisional Application No. 61/940,320, filed on Feb. 14, 2014. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is object recognition technologies.

BACKGROUND

The following description includes information that may be useful in understanding the present invention. It is not an admission that any of the information provided herein is prior art or relevant to the presently claimed invention, or that any publication specifically or implicitly referenced is prior art.

Object recognition systems require large databases of known objects where the database stores attributes or parameters, typically image attributes, by which devices can recognize corresponding objects. Unfortunately, populating such databases is a very expensive, time consuming process. For example, to build sufficient information to recognize a moderately complex object, say a toy, the object has to be imaged and analyzed from many different views in a controlled setting. Image characteristics from the various views can then be stored in the object recognition database for future consumption. This approach creates a bottle neck for object ingestion because only one object can be ingested at a time.

Numerous examples of image-based object recognition techniques exist that leverage image characteristics. For example, U.S. Pat. No. 5,581,634 to Heide titled "Recognition System with an Automated Development Tool", filed Apr. 6, 1994, describes using a tree structure to recognize objects and providing developers a tool to generate new recognizers. Similarly, co-owned U.S. Pat. Nos. 7,016,532; 7,477,780; 7,680,324; and 7,565,008 also describe techniques for recognizing objects. These and other references are useful with respect to recognizing objects based on image characteristics, but fail to provide for easy, automated object ingestion into a recognition infrastructure, especially for commodity objects in an uncontrolled setting. For example, ingesting objects in a public setting would be very difficult due to the varied shapes of objects in such settings.

Some progress with respect to attempting to identify objects in a search engine by searching based on shape. For example, U.S. Pat. No. 6,173,066 to Peurach et al. titled "Pose Determination and Tracking by Matching 3D Objects to a 2D Sensor", filed May 21, 1997, discusses constructing queries based on geometric descriptions. Another example related to traffic signs includes U.S. Pat. No. 8,170,340 to Klefenz titled "Device, Method, and Computer Program for Identifying a Traffic Sign in an Image", filed Dec. 18, 2007. Klefenz relies on edge detection to identify a sign. Still another example includes U.S. Pat. No. 8,429,174 to Ramani et al. titled "Methods, Systems, and Data Structures for Performing Searches on Three Dimensional Objects" filed Jan. 23, 2004. Ramani describes using 3D shapes, possibly based on user defined similarity criteria, to find known objects.

Other examples of shape-based object analysis include U.S. patent application publication 2006/0122999 to Sosnov et al. titled "Apparatus for and Method of Producing Graphics Contents and Computer-Readable Recording Medium Storing Computer Program for Executing the Method", filed Sep. 20, 2005; U.S. patent application publication 2008/0103734 to Kobayashi titled "Supporting Apparatus, Design Supporting Method, and CAD System", filed Aug. 27, 2007; U.S. patent application publication 2010/0092093 to Akatsuka et al. titled "Feature Matching Method", filed Aug. 12, 2009; and U.S. patent application publication 2013/0336554 to Lewis et al. titled "Methods and Systems for Identifying, Marking, and Inventorying Large Quantities of Unique Surgical Instruments", filed Mar. 14, 2013.

Although the above shaped-based searching techniques are useful with respect to searching for objects in a database, they still don't address construction of a database through commodity object ingestion. To some degree, U.S. Pat. No. 7,643,683 to Miller titled "Generation of Image Database for Multifeatured Objects", filed Mar. 5, 2004, makes some further progress in database construction by using objects of the same generic type to generate as many images as possible, which are used to populate an image database for identification purposes. Miller seeks to generate 3D representations by using 2D projections from a range of viewpoints. Miller also uses small or large deformations of the 3D representations corresponding to anticipated internal movements in order to generate projections of the representations. Miller's database comprises images, which are useful for generating avatars as discussed. However, such a database is less useful with respect to "in-the-field" object recognition via devices having limited memory capacity, a smart phone for example. A compact database of object recognition information is still required.

In a somewhat similar to the Miller approach, shape information can be used to aid in ingesting object information by building object models from imaged objects. For example, U.S. patent application publication 2013/0293539 to Hunt et al. titled "Volume Dimensioning Systems and Methods", filed May 4, 2012, describes building a wireframe package around a three dimensional object. In some cases, insufficient information is available from a signal point of view, so additional data is obtained from other points of view for selecting geometric primitives to fit the wireframe model to the object. Additional examples of using shapes to generate object databases include U.S. Pat. No. 7,929,775 to Hager et al. titled "System and Method for Recognition in 2D Images Using 3D Class Models", filed Jun. 13, 2006. Hager discusses acquiring 3D images of objects, then placing corresponding object models into a canonical geometric form. Although Hager seeks to create an object database, Hager still requires controlled conditions, which places the technology outside the scope of unskilled technicians in an uncontrolled ingestion setting. Yet another example of building object models includes U.S. Pat. No. 8,532,368 to Se et al. titled "Method and Apparatus for Producing 3D model of an Environment", filed Aug. 15, 2011. Se discusses generating photorealistic 3D models of objects from stereo images.

Even if shapes and object models are used to build object databases, some objects fail to fit a priori canonical geometric forms. In such cases, the forms must be altered to fit the object. Along these lines, further progress toward extracting objects from a photo is described in the paper "3-Sweep: Extracting Editable Objects from a Single Photo", to Chen et al., SIGGRAPH Asia 2013, November 19-22, 2013. Chen describes allowing a human to snap components to an image of an object, which then provides for extracting 3D objects. Unfortunately, such techniques still rely very heavily on human interaction and are not easily automatable. In a somewhat similar vein U.S. patent application publication to Vaddadi et al. titled "Methods and Systems for Capturing and Moving 3D Models and True-Scale Metadata of Real World Objects", filed Jul. 27, 2012, also discusses generating a model based on user input and captured image data. Deforming shape variations is also discussed by U.K. patent application publication GB 2388237 to Adeyoola et al. titled "Computer Implemented Methods and Systems for Generating Virtual Body Models for Garment Fit Visualization", published Aug. 22, 2012. Adeyoola describes generating a virtual body model where images of garments can be combined with the virtual body model. The techniques disclosed offer insight into how to construct object model based on image data and geometric forms. Such models are too resource intensive to manage and use in the field. Still, devices in the field require compact recognition data to determine if an imaged object in the field matches a known object in an object recognition data set.

U.S. patent application publication 2005/0286767 to Hager et al. titled "System and Method for 3D Object Recognition Using Range and Intensity", filed Jun. 22, 2005, progresses further by using descriptors to identify objects. Hager describes acquiring images of a scene and comparing descriptors from the scene to descriptors of known models to identify objects within the scene. Descriptors provide for fast object recognition. Still, one must compile a database of descriptors during ingestion of object information. Along these lines, effort has been directed to building descriptor information based on object models. One example of capturing 3D object information includes International patent application publication WO 2009/069071 to Kleinhorst et al. titled "Method and System for Three-Dimensional Object Recognition", filed Nov. 25, 2008, discussed building object models from multiple views of an object where the 3D feature descriptors are computed using 2D feature descriptors and camera's known view.

Kleinhorst provides for generating descriptors from a camera's known view point. However, for ingestion of commodity objects a camera's view point might not be known or calculable even if shape information is available. Consequently there still remains a need to determine from which perspectives object recognition information should be derived. This is especially true when the object model can deviate from known shapes. Further, there is still a need for systems and methods through which one can ingest large numbers of ordinary or commodity objects quickly into an object recognition database of known objects.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems and methods in which real-world objects can be ingested into an object recognition database using canonical shapes. One aspect of the inventive subject matter includes an object recognition ingestion system having a canonical shape database and an object ingestion engine. The canonical shape database is programmed to perform the step of storing one or more shape objects where the shape objects represent manageable data objects. Each shape object can be considered to represent a known canonical shape or object template; for example a sphere, cylinder, pyramid, mug, vehicle, or other type of shape. Further the shape objects include geometrical attributes reflecting the aspects of their corresponding shape, a radius, length, width, or other geometrical features for example. Of particular note, the shape objects also include one or more reference point-of-views (PoVs) that indicate preferred perspectives from which an object having a corresponding shape could be analyzed.

The object ingestion engine can be coupled with the canonical shape database and programmed to perform the step of fulfilling the roles or responsibilities of ingesting object information to populate an object recognition database. The engine obtains image data that includes a digital representation of a target object of interest. The engine further derives one or more edges of the object from the image data, possibly by executing an implementation of one or more edge detection algorithms. Each of the derived edges includes geometrical information relating to the nature of the edge (e.g., radius, length, edgels, edgelets, edge descriptors, etc.). The engine can use the information relating to the set of edges to obtain a set of shape objects as a result set from the canonical shape database. In some embodiments, the edge geometrical information is used to identify shape objects that have compatible or complementary shape attributes as the set of edges. At least one of the shape objects in the result set is selected as a candidate shape object for building an object model of the target object. Thus, the engine can continue analyzing the target object by generating one or more object models of the target object based on the selected shape and the image data. For example, the geometrical attributes of the shape can be adjusted or take on specific values related to the object, and the image data of the object can be used to texture and/or paint the object model. Further, the engine is programmed to perform the step of using the selected shape's reference PoVs to determine from which PoVs the object model should be analyzed to generate key frame information. The engine uses the reference PoVs to drive a set of model key frame PoVs, possibly based on one or more rules or object symmetry, which will be used for generating the key frames. Further, the engine instantiates a descriptor object model from the object model where the descriptor model includes recognition algorithm descriptors (e.g., SIFT, FREAK, FAST, etc.) having locations within or on the object model and relative to the model key frame PoVs. From the descriptor object model, the engine further compiles one or more key frame bundles that can be used by other devices to recognize the target object. The key frame bundles can include one or more of an image of the object model from a corresponding key frame PoV, a descriptor related to the key frame PoV, a normal vector, or other recognition information. The key frame bundles can be stored in an object recognition database for consumption by other devices when they are required to recognize the target object. Further the key frame bundles can be correlated with object information, address, content information, applications, software, commands, or other types of media as desired.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
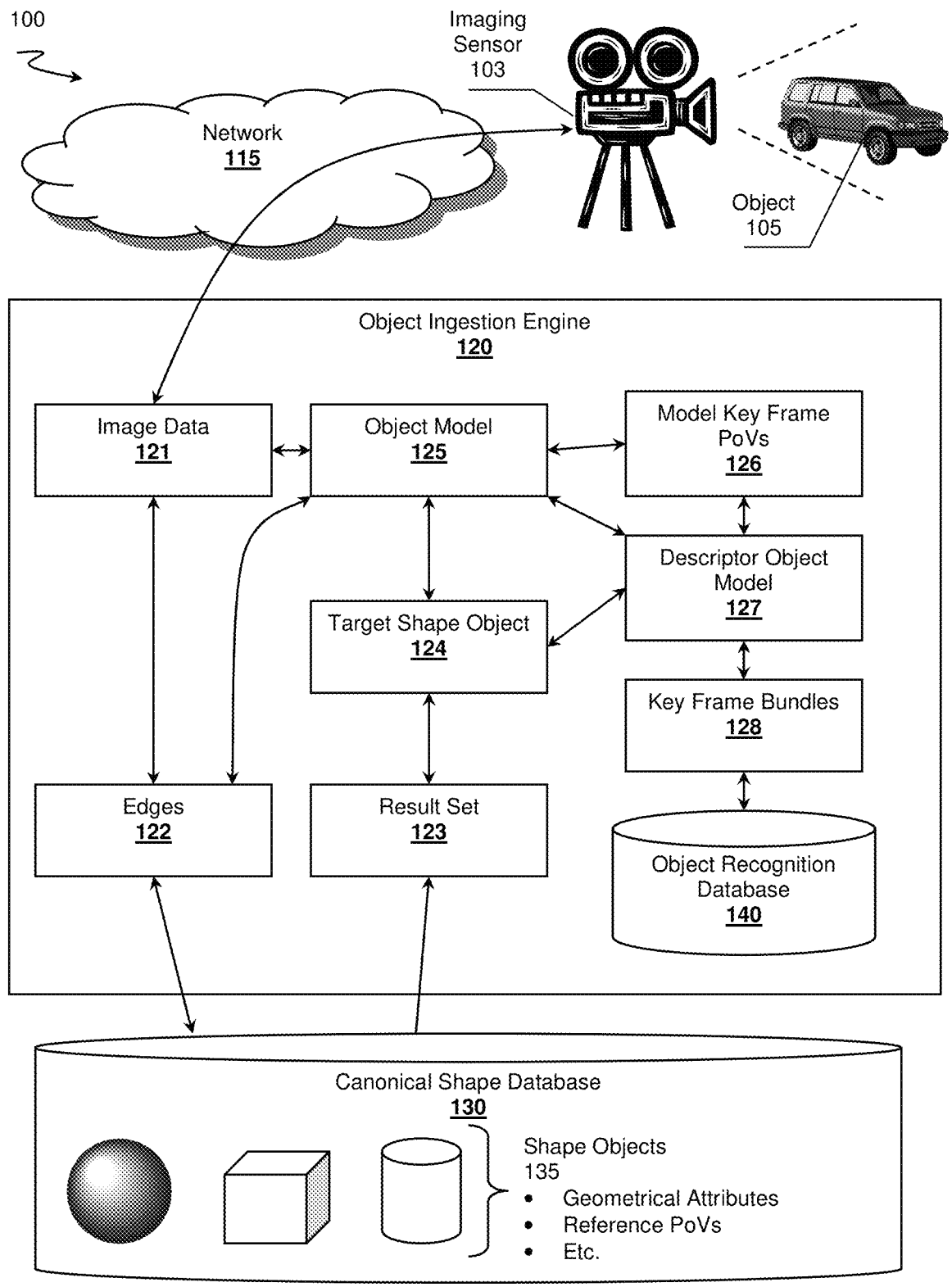
FIG. 1 presents an object recognition ingestion ecosystem.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, or a module is described as configured to perform a set of functions, the meaning of "configured to" or "programmed to" is defined as one or more processors being programmed by a set of software instructions to perform the set of functions.

One should appreciate that the disclosed object recognition system provides numerous advantageous technical effects. The system enables the object ingestion to be performed autonomously (i.e., without the need of human interferences), and in an uncontrolled, in-the-field setting. Thus, instead of having to create new image data of objects under a controlled setting when performing object ingestion, the object recognition system of some embodiments can make use of a priori, existing image data of objects (e.g., existing movies, pictures, etc.) to build the objects database. In addition, the object recognition system of some embodiments allows the objects database to be updated with new information (e.g., from new image data of an object exist in the objects database), thereby continuously improving the accuracy of object recognition over time.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The focus of the disclosed inventive subject matter is to enable construction or configuration of a computing system to operate on vast quantities of digital data, beyond the capabilities of a human. Although the digital data represents a real-world object, it should be appreciated that the digital data is a representation of one or more digital models of the real-world object, not the real-world object itself. By instantiation of such digital models in the memory of the computing devices, the computing devices are able to manage the digital data or models in a manner that could provide utility to a user of the computing device that the user would lack without such a tool.

FIG. 1 illustrates an example object recognition ingestion system 100 of some embodiments. System 100 is constructed to ingest one or more of object 105 quickly, and preferably in an automated fashion. As images of object 105 are collected in the form of image data 121, object ingestion engine 120 of some embodiments converts or otherwise transforms image data 121 into recognition parameter sets that can be leveraged by computing devices to recognize similar objects in the field. Specifically, object ingestion engine 120 combines a priori known shape objects 135 from canonical shape database 130 with the image data 121 to produce one or more of key frame bundle 128. Key frame bundles 128 can then be economically sent to smart phones, or other devices. Such devices use key frame bundles 128 in the field to recognize objects in uncontrolled settings.

Canonical shape database 130 comprises a computing device having a memory storing shape objects 135 according to one or more indexing schemes. Shape objects 135 represent data objects for known generic canonical shapes or geometrical primitives. Example canonical shapes include simple shapes (e.g., line, circle, sphere, cylinder, cone, square, cube, box, platonic solid, triangle, pyramid, torus, etc.), object templates (e.g., tree, car, plane, building, human, face, appliance, toy, tissue, internal organ, etc.), compound shapes that include two geometric primitives (e.g., torus and cylinder can represent a mug, etc.), or other shapes. In some embodiments, each compound shape can be generated by a grammar (a pattern) that defines generating rules (e.g., a staircase, a snake, etc.).

Each shape object 135 has one or more geometrical attributes that represent the corresponding shape, but typically lack values. As an example, a sphere shape object could have attributes representing a radius (r), a shell thickness (t), or other parameter. It should be noted that a sphere could be a degenerate case of an ellipsoid. A cylinder might include a radius, a height (h), or even one or more angles (θ) for cases where cylindrical objects are skewed. A face shape object could have attributes representing locations (l) and sizes (s) of eyes, nose, mouth, and ears, distance (d) between the eyes, distance (d) between the ears, and/or face length (l) and width (w). A person shape object could include a face shape object, as well as other attributes representing height (h), shoulder width (sw), torso-to-legs ratio (t2l ratio), arms length (al), etc. A beverage cans shape object could include attributes representing a radius (r) and a height (h); a cylinder for example. For shapes having different parts that can move with respect to each other (e.g., a person shape object, etc.), the corresponding shape object can also include a grammar in which a range of motion is parameterized for all degrees of freedom at joints of composite shapes.

Other types of shape objects include 3D objects, and objects comprising topological classification (e.g., sphere, torus, knots, number of holes, etc.). Additional geometrical attributes that can describe shape objects 135 include width, thickness, depth, diameter, a hole, number of holes, number of sides, a geometric center, a formula, a texture, a bounding box, a chirality (e.g., a left-handed screw, a right-handed screw, etc.), a periodicity, an orientation, an angular pitch (e.g., an angle subtended by the circular pitch in a helical object such as a gear, etc), a scaling, or other attributes that can take on values. Shape objects 135 can also include one or more shape attributes through which shape objects 135 can be referenced. Shape attributes could include names, keys, indices by which shape objects 135 are stored, context, relevant descriptors (e.g., edge descriptors, etc.), or other features.

Of particular interest, each of the shape objects 135 also includes one or more reference key frame point-of-views ("PoVs"). A reference key frame PoV represents a point of view from which a shape object can be viewed, and collectively, the reference key frame PoVs associated with the shape object define which PoV the shape object (or an object or a 3D model of an object that is associated with the shape object) should be analyzed to generate key frame bundles 128. Each reference key frame PoV can include a normal vector, a distance, one or more rules that govern the generation of the actual PoV during analysis, symmetry information, or other factors that indicate how corresponding shaped objects are to be analyzed.

In some embodiments, shape objects 135 are indexed by one or more descriptors (e.g., SIFT descriptors, edge descriptors, key points, etc.), possibly in the form of a tree structure (e.g., KD tree, spill tree, etc.). The descriptors are derived from the shape objects 135 in the canonical shape database 130. Such an approach is advantageous in the field where test images often fail to generate exact matches to the known descriptors. To implement the indexing scheme using a KD tree structure, one begins by constructing a root node for the tree. The root node is the first level of a KD tree where the data is split into two halves by a threshold value. Preferably, this split is made at a median in the descriptor space (dimension) with the greatest variance in the descriptor dataset. Under this approach, the root node of the tree often represents the median descriptor within the descriptor space. Each of the two halves of the data is then recursively split in the same way to create a fully balanced binary tree. At the bottom of the tree, each tree node corresponds to one or more descriptors in the descriptor space (e.g., SIFT descriptor space, edge descriptor space, key points space, etc.). Thus, a different KD tree can be constructed for each descriptor space, given the descriptor dataset derived from the shapes 130. A more thorough explanation on the construction and usage of KD trees with respect to descriptors can be found in "Optimised KD-trees for Fast Image Descriptor Matching" by Chanop Silpa-Anan et al., published in 2008, which is incorporated herein in its entirety.

Alternatively, shape objects 135 can be stored as records within a database using other types of indices, possibly including location information, time information, relevant context, relevant device attributes, "lenses" that provide contextual filters, or other schemas. Canonical shape database 130 could be implemented using known data structures as referenced previously, file systems, leverage existing databases (e.g., Access, PostGresSQL, Oracle, etc.), or even include proprietary database structures.

Although object 105 is presented as a vehicle in this figure, the object 105 may represent a broad spectrum of possible objects or object classes. Object 105 could include food items, purchasable products, documents, people, faces, clothing, electronic devices, internal organs, animals, plants, books, laboratory equipment, weapons, planes, mines, bombs, stationery, files, or other types of objects. In more preferred embodiments, object 105 represents a three-dimensional ("3D") object, possibly in an uncontrolled setting. For example, the uncontrolled setting could include a grocery store with many products on a shelf or a car lot with numerous automobiles distributed across the lot. In the case of the grocery store, object 105 could correspond to products on the shelf, while in the case of the car lot, object 105 could correspond to the automobiles. The uncontrolled setting could also include a school, and object 105 could correspond to stationery, books, students, and teachers in the classrooms. The uncontrolled setting could also include a military training field, and object 105 could correspond to weapons, landmines, soldiers (both friendly and adverse), landmarks, etc. The uncontrolled setting could also include a garden, where the object 105 could correspond to different flowers, trees, animals, and insects. Other uncontrolled settings could include a shopping mall, a tourist attraction, a highway, a store, an office, a home, a hospital, or other settings.

System 100 can also include imaging sensor 103, which is programmed to perform the step of capturing image data 121 of object 105. Imaging sensor 103 can include one or more cameras or other sensors capable of generating a digital representation of object 105. Example imaging sensor 103 can include a CCD sensor, a CMOS sensor, a NMOS sensor, or other types of sensors. In some embodiments, the imaging sensor 103 also includes depth sensors such as Microsoft® Kinect® or Occipital® StructureSensor® for generating depth information for the image data 121. As mentioned above, one of the advantages of the object ingestion system is that it can use any existing and readily available image source to build the datasets for the object recognition database 140. For example, it is contemplated that images from Google® Street View can be used to build a set of object recognition data for recognizing locations and buildings within the object recognition database 140. Still, one should appreciate that imaging sensor 103 could capture other types of image data 121 beyond visible image data. For example, in a medical setting, imaging sensor 103 could include an ultrasound transducer that captures ultrasound or acoustic image data. Image data 121 can also take on different forms including a still image, video data, medical images, non-visible spectrum data, or other image data modalities. Still further imaging sensor 103 can be a part of an imaging device, a cell phone for example. Other imaging devices that can comprise imaging sensor 103 include robots, vehicles, game consoles, game interfaces, webcams, video cameras, digital cameras, medical devices, or other types of devices.

In some embodiments, image data 121 is transmitted from imaging sensor 103 to object ingestion engine 120 over network 115 (e.g., Internet, wi-fi, WAN, LAN, VPN, etc.). In embodiments where imaging sensor 103 is housed within the same computing device as object ingestion engine 120, network 115 can be considered to represent an internal computing bus or even a shared memory location. Network 115 can also include a short range wired or wireless network (e.g., Bluetooth®, Firewire, USB, WUSB, Zigbee, etc.). For example, imaging sensor 103 could be part of a head mount visor (e.g., Google Glass®, Microsoft HoloLens®, etc.), which captures image data 121 and transmits image data 121 via a Bluetooth connection to a cell phone operating as object ingestion engine 120.

Object ingestion engine 120 obtains image data 121 representative of object 105 and begins processing image data 121 to derive key frame bundles 128. Once image data 121 is obtained, object ingestion engine 120 derives one or more sets of edges 122 related to object 105 in image data 121. Edges 122 can be derived through various techniques including canny edge detection, Gabor filter, Hough transform, ridge detection, Sobel edge detection, Kayyali edge detection, or other algorithms known or yet to be invented. Of particular note, edges 122 preferably include geometrical information or edge attributes relating to the nature of the edges, possibly including curvatures, length, radius, affine transformation information, edge descriptors, or other information relating to edges 122. In addition to edges, the object ingestion engine 120 can also derive other information about the relationships within and among the derived edges—such as edgels, edgelets, and constellations of edgelets. Using the dimensions, sizes, and ratios among the edgelets and constellations of edgelets, the object ingestion engine 120 can derive edge descriptors. Detailed explanation on how edge descriptors can be generated from edges and edge-related attributes of an image can be found in the co-owned U.S. application Ser. No. 14/623,341 entitled "Edge-Based Recognition, Systems and Methods" by Bing Song et al.

In instances where the sensors 103 is capable of obtaining depth data, the ingestion engine 120 can either compute 2D edges from the 3D representation, or obtain 3D shape information directly from image data 121 and use the 3D shape information to query the canonical shape database 130.

In view that image data 121 is likely two-dimensional ("2D"), edges 122 can also include information representing estimation of depth, scale, orientation, or other information. For example, the object ingestion engine 120 of some embodiments can execute an implementation of a depth analysis algorithm on the image data 121 and edges 122. Detailed information on an example depth analysis algorithm can be found in U.S. Publication 2012/0163672 to McKinnon titled "Depth Estimate Determination, Systems and Methods," which is incorporated herein in its entirety.

Object ingestion engine 120 can compile the edge geometrical information into one or more queries targeting the indexing system of canonical shape database 130. The queries can take on a complementary form to the schema by which shape objects 135 are stored. For example, if shape objects 135 are stored within a tree structure in memory according to edge descriptors, the query could represent a call to a corresponding API that accepts edge descriptors as a calling parameter. Another example could include submitting an SQL query having edge geometrical information to an SQL engine operating within canonical shape database 130. Thus, the term "query" should be considered as relating to requesting shape objects 135 that are considered to match shape selection criteria regardless of the actual nature of the query.

In response to the query, object ingestion engine 120 obtains shape result set 123 from canonical shape database 130. Shape result set 123 includes one or more shape objects 135 that have shape attributes satisfying shape selection criteria determined as a function of the edge geometrical information from edges 122. Consider an example where object 105 includes an automobile. Edges 122 might include multiple edge parameters including high curvatures. In response, object ingestion engine 120 might construct a query that requires shape objects 135 to have shape attributes supporting high curvature. Further, the query could include the location where image data 121 was captured, a highway GPS location for example. In response, shape result set 123 can include shape objects 135 having shape attributes that relate to curvature (e.g., cylinder, circle, sphere) and possibly having shape attributes that related to automobiles on the highway (e.g., vehicle template, tire template, etc.). Suitable techniques that match shapes and that can be adapted for use with the inventive subject matter includes those disclosed U.S. Pat. No. 6,728,392 to Joshi titled "Shape Comparison Using a Rotational Variation Metric and Applications Thereof", filed Jan. 30, 2001.

Object ingestion engine 120 selects at least one target shape object 124 from the shape objects 135 as candidate shape objects in result set 123. Each of the candidate shape objects can include one or more scores indicating the degree to which they satisfy the shape selection criteria. Object ingestion engine 120 can derive scores through various techniques. The shape object scores can be weighted by how well the geometrical attributes of shape objects 135 conform or can be adapted to edges 122, subject to affine transformations. Each of the candidate shape objects, with adjustment to the different attributes and parameters, can be aligned with (or overlaid on top of) the edges 122 on the image 121 for comparison. The score can be calculated as a function of a percentage that the shape and the edges overlap. Furthermore, the object ingestion engine 120 can also calculate the score based on the non-overlapped portion by how close the edges 122 are to the shapes using any one or a combination of metrics (e.g., Chi square, Malanobis distance, Bayesian classifier result, etc.). The "distance" between the edges 122 and the edges of the shapes can be based on a difference in curvature for example. An example edge score can be the sum or average distance of each edge pixel in the aligned shape objects to its closest edge pixel in the query image. This is often referred to as a Distance Transform.

Using the scoring scheme as described above, a sphere having a single radius might have an acceptable match to the edges of an egg in the image from some PoVs, but an ellipsoid having three parameters might be a better fit, and thus receive a higher score from the object ingestion engine 120 than the sphere shape.

Further, the scores can also be calculated and/or modified based on weights determined from a context (e.g., location, orientation, temperature, other recognized objects in the image 121, etc.). In these embodiments, each shape object in the canonical shape database 130 is associated with a set of relevant context (e.g., locations, orientations, temperatures, other objects likely to be nearby, etc.). For example, a car shape object can have positive associations with locations such as roads, freeways, parking lots, and other nearby objects such as other cars, street lights, etc. That is, if the image data 121 indicates any one of these positive association contexts, the score for the corresponding shape object will be increased by the object ingestion engine 120. It is also contemplated that different association can have different weights, such that a positive association with one context (e.g., location) can increase the score by a larger amount than a positive association with another context (e.g., nearby objects).

In addition to positive associations, it is further contemplated that each shape object in the database 130 can have negative associations with another set of context. For example, the car shape object discussed above can have negative associations with locations such as oceans, lakes, rural mountains, etc. and nearby objects such as airplanes, ships, etc. That is, if the image data 121 indicates any one of these negative association contexts, the ingestion engine 120 will reduce the score for the corresponding shape object. Similar to the positive associations, these negative associations can also be weighted, such that a negative association with one context (e.g., location) can reduce the score by a larger amount than a negative association with another context (e.g., nearby objects).

If shape objects 135 are contextually relevant to a location, a time, or even descriptor match, then such context information can adjust the score for the corresponding shape object 135. In some embodiments where object ingestion engine 120 lacks certainty with respect to target shape object 124, at least within a threshold, object ingestion engine 120 can future request user interaction to select which of the shape objects 135 in result set 123 would be a better fit to the object.

The reader is reminded that target shape object 124 can comprise geometrical information, shape attributes, and reference key frame PoVs. Although the geometrical attributes are present within target shape object 124, they have yet to take on significant values. Object ingestion engine 120 assigns values to the geometrical attributes of target shape object 124 possibly from edges 122 or from image data 121. For example, subject to an affine transformation, a curve represented in edges 122 that comprises a length, a curvature, and a radius can be used to assign a radial value to a sphere and possibly a scale value. The radial value could have units of pixels, but could also have a value based on standard units (e.g., meters, yards, inches, centimeters, micrometers, etc.) of distance if additional information from image data 121 can be ascertained. In some embodiments, scale information can be obtained based on estimated depth data, recognized known markers of objects 105 (e.g., tags, RFID chip information, bar codes, watermarks, etc.), or other information sources. In such scenarios a relative scale or even an absolute scale of object 105 can be inferred.

In some of these embodiments, each shape object within the canonical shape database 130 is also assigned a set of values along multiple dimensions (e.g., length, width, height, circumference, radius, etc.) or a range of values along those dimensions that represent a typical dimension/size of its corresponding real-world object. For example, a street sign object is assigned with a height between two to three meters as actual street signs usually have heights within that range. Similarly, a car object is assigned with a length of between 1.5 meters and 5 meters as actual cars usually have lengths within that range. Using these pre-assigned dimensions/sizes of known objects, the object ingestion engine 120 can analyze recognized objects within the scene represented in the image data 121 and estimate depth data for image data 121. In addition, the dimensions/sizes of these known objects and also assist the object ingestion engine 120 to derive a scale of the image 121 and thus estimate the actual size of the target object within the image 121. The estimated size of the target object can be used to filter out candidate shape objects that do not fit within the threshold dimensions and sizes. For example, when it is estimated that the target object has a length of 0.2 meters, the object ingestion engine 120 can filter out the car shape object as typical a car has a length of between 1.5 meters and 5 meters. In some embodiments, once a scale and a depth of the image 121 is determined, the ingestion engine 120 can create bounding boxes for the different candidate shape objects that is in the proper scale and size with respect to the scale of the image 121, and filter out the candidate shape objects with bounding boxes that cannot completely encompass the target object in the image 121. However, in some embodiments, the object ingestion engine 120 may not be restricted to use the pre-assigned dimensions when some other attributes of the object should be considered in analyzing recognized objects. For example, if a car within the scene is a toy car or a model car for children, rather than an actual car, the pre-assigned dimensions of the car object can be relaxed to accommodate the variations of the object.

The assigned geometrical values of target shape object 124 (the geometrical values that give the optimal fit, best match, with the target object) allow object ingestion engine 120 to generate one or more of object model 125. Object model 125 can represent a 3D computer model in the memory of object ingestion engine 120, which can be displayed or otherwise rendered as desired (e.g., graphically displayed, printed on a 3D printer, etc.). Further, object ingestion engine 120 can map selected portions of image data 121 associated with edges 122 to object model 125, at least to the extent that the selected portions of the image data 121 are visible. In some embodiments, the selected portions of image data 121 can be processed before binding to object model 125. For example, the portions can be despeckled, converted to grey scale, converted to a specific hue, or have other operations performed. Thus, object model 125 allows object ingestion engine to continue automated processing and ingestion of object 105. One example technique that could be modified for construction of object model 125 includes those described by "3-Sweep: Extracting Editable Objects from a Single Photo", to Chen et al., SIGGRAPH Asia 2013, Nov. 19-22, 2013. However the 3-Sweep technique requires at least three user interactions to construct a model. In the disclosed approach, the requirement for user interaction is eliminated through mapping edge geometrical information to geometrical attributes of shapes.

Recall that target shape object 124 also includes one or more reference key frame PoVs. Object ingestion engine 120 leverages the reference key frame PoVs of target shape object 124 to derive a set of model key frame PoVs 126 from which further analysis is performed. There is no requirement for a one-to-one correspondence between reference key frame PoVs of target shape object 124 and model key frame PoVs 126 because object ingestion engine 120 can leverage symmetry information. For example, a cylinder shape object might include two reference key frame PoVs. A first PoV might be bound to one end of the cylinder and include rules for deriving additional model key frame PoVs 126 for both ends of the cylinder due to symmetry. A second PoV might be bound to a side of the cylinder. Again, employing symmetry and rules associated with the second PoV, object ingestion engine 120 generates addition model key frame PoVs 126 that target relevant areas around the cylinder. The rules for generating model key frame PoVs 126 can depend on symmetry of the corresponding shape object 135, feature density observed in image data 121, geometrical information for edges 122, user input, or other factors.

Object ingestion engine 120 can simulate capturing image data of object 105 by simulating a camera at each model key frame PoV 126. The camera simulation can incorporate simulated parameters, possibly including focal length, lighting conditions, lens properties, make, model, distance, field of view, or other parameters. Object ingestion engine 120 models capturing image data at each model key frame PoV 126 and deriving one or more descriptors from the resulting image data at each PoV. An astute reader will appreciate that binding reference PoVs to generic or primitive shape objects 135 eliminates the requirement for controlled settings for object ingestion. Rather, the object ingestion engine 120 can operate fully autonomously with minimal or without user interaction in an uncontrolled, in-the-field setting.

The descriptors can be derived according to one or more feature or recognition algorithms. Example descriptors can include those generated by SIFT, FREAK, BRISK, FAST, SURF, DAISY, or other algorithms. The set of derived descriptors can be a homogenous set of descriptors (e.g., all SIFT descriptors) or a heterogeneous set of descriptors (e.g., a mix of various types). In view that object ingestion engine 120 compiles the set of descriptors base on object model 125 and model key frame PoVs 126, the location of each descriptor with respect to the object model and model key frame PoVs 126 is known. In some embodiments, the object ingestion engine 120 executes an implementation of one or more of these descriptor generating algorithms to derive descriptors. Through the derivation of descriptors, object ingestion engine 120 combines the descriptors with object model 125 and model key frame PoVs 126 to instantiate one or more of descriptor object model 127 where descriptor object model 127 comprises the descriptors having locations on object model 125 relative to model key frame PoVs. In scenarios where not all features or views of object 105 are present in image data 121, the set of model key frame PoVs can be limited to visible portions within image data 121.

Object ingestion engine 120 creates a set of key frame bundles 128 from descriptor object model 127 as a function of the set of model key frame PoVs 126. Key frame bundles 128 represent quanta of recognition information that can be consumed by other devices in order to enable those devices to recognize object 105. In some embodiments, at least one key frame bundle 128 is created for each model key frame PoV 126. Such an approach is advantageous because it allows devices in the field to recognize object 105 from multiple viewpoints or distances. Key frame bundles are discussed more fully in co-owned U.S. applications having Ser. No. 14/332,371 to Wnuk et al. titled "Fast Recognition Algorithm Processing, Systems and Methods", filed Jul. 15, 2014; and Ser. No. 14/546,873 to Siddiqui et al. titled "Silhouette-Based Object and Texture Alignment, Systems and Methods", filed Nov. 18, 2013. Key frame bundle 128 can include zero or more descriptors, one or more normal vectors that can correspond to a model key frame PoV 126, image data obtained from object model 125, metadata indicating which algorithms should be associated with the bundle, context attributes, or other recognition parameters. For example, key frame bundle 128 could include a thumb nail snap shot (e.g., 32×32 pixels, 64×64 pixels, etc.) of at least a portion of object model 125 along with one or more descriptors. Key frame bundles 128 can be stored in object recognition database 140.

Object recognition database 140 is illustrated as part of object ingestion engine 120. However, in some embodiments, object recognition database 140 could comprises a separate computing device, possibly one or more servers located across network 115, or even over the Internet. Thus, object recognition database 140 could operate as a recognition service (e.g., PaaS, IaaS, SaaS, etc.). Further, some embodiments can include a single computing device, possibly a mobile device (e.g., cell phone, robot, vehicle, etc.) that includes one or more of the elements in system 100. For example, a smart phone could be provisioned with imaging sensor 103, object ingestion engine 120, canonical shape database 130, and object recognition database 140, or any combination therefore.

Computing devices can obtain key frame bundles 128 from object recognition database 140 through various techniques. In some scenarios, a computing device context (e.g., location, time, intent, weather, etc.) can trigger which key frame bundles 128 should be obtained to enable object recognition in a setting. In other scenarios, a collection of key frame bundles 128 can be installed within the computing device, possibly as part of an application or recognition module. The key frame bundles 128 can form a local recognition module either as a priori packaged or as created by the computing device. Consider a scenario where a consumer is shopping at a grocery store. The consumer's smart phone or tablet can download all key frame bundles 128 relevant to recognizing products on the store shelves. The bundles can be arranged a priori into a package having one or more trees (e.g., spill tree, etc.) based on the bundles corresponding descriptors within the key frame bundles 128. Another approach could be that the key frame bundles 128 for the grocery store only include normal vectors and thumb nail images while lacking descriptors. In such a case, the computing device can apply a corresponding recognition algorithm to re-derive descriptors to instantiate the recognition trees itself. In some embodiments, a web-based service can be created to provide such functions of computer devices (e.g., obtaining key frame bundles, etc.), possibly via an application programming interface (API) (e.g., URL) based on a structured data file (e.g., a JSON file, an XML file, etc.).

The computing device can recognize objects by capturing a digital representation of scene and then applying an implementation of one or more recognition algorithms to the digital representation. The device generates one or more descriptors which can then be compared to the descriptors in the local recognition module built from the relevant key frames bundles 128, which in turn can reference or point to relevant object information or other types of content.

Figure 2:
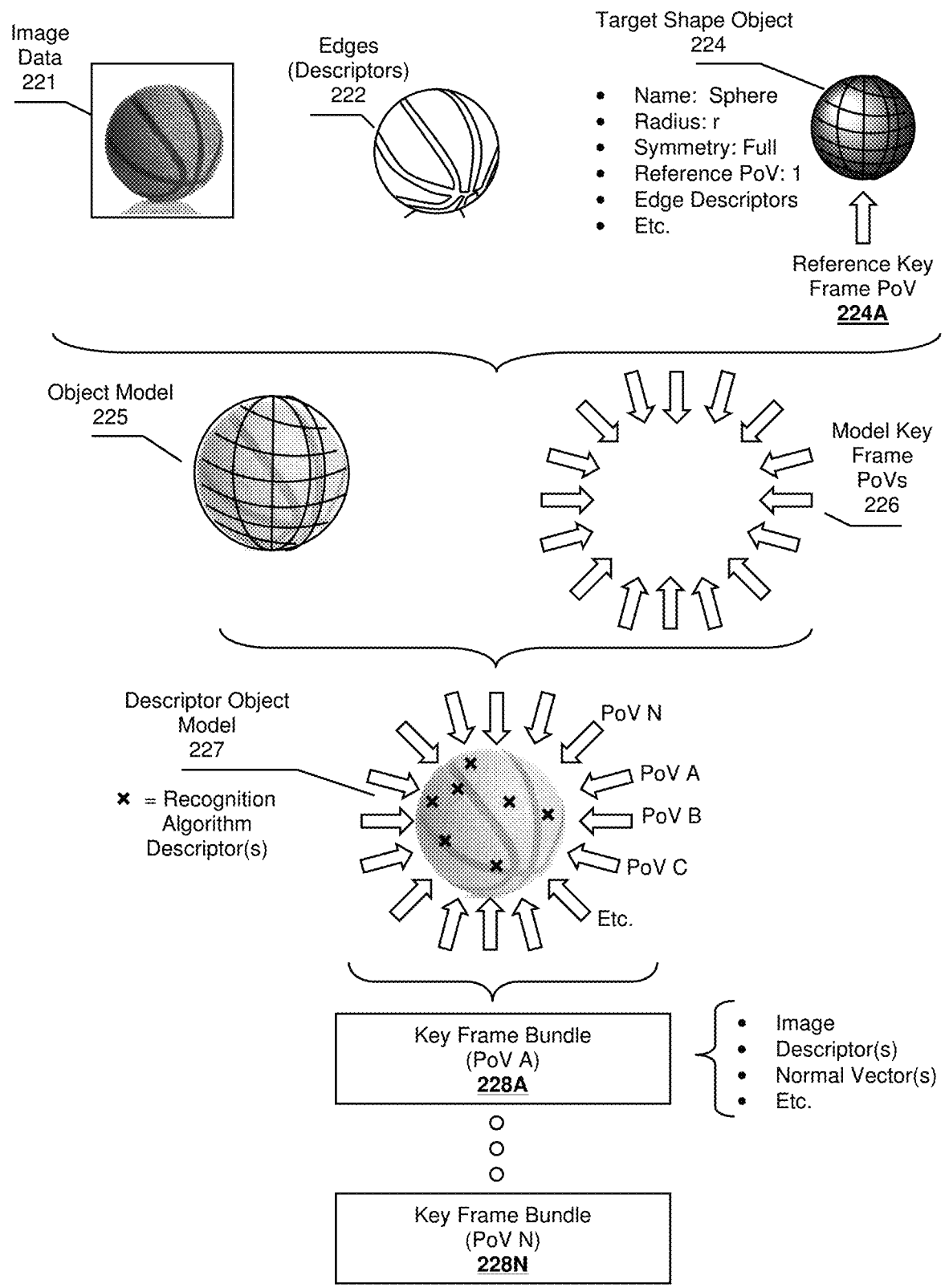
FIG. 2 provides an overview of how object data is processed to give rise to key frame bundles.

FIG. 2 presents an overview of the method by which objects are ingested by system 100 of FIG. 1.

The method of ingestion includes the step of capturing image data 221 of an object, a basketball in this example, via one or more imaging sensors. Image data 221 can be captured in real time from an imagining sensor, or could be obtained via other sources. For example, image data 221 could include video content obtained from YouTube®, television programming, video games, or other sources. In some embodiments, the action of capturing image data 221 can be performed in a substantially continuous manner, which gives rise to the ability to refine the object models discussed previously. The method can further include preprocessing image data 221 to remove (or add) features such as speckles, shadows, or other features.

Another step of the method includes the object ingestion engine deriving a set of edges 222 related to the object from image data 221. Edges 222 can be derived based on numerous techniques and can be applied on an image by image basis, video frame by video frame basis, or other aspect of image data 221. The object ingesting engine can also perform the step of compiling geometrical information associated with edges 222. In the example presented, it is likely only the external edge forming a circle might be relevant rather than edges 222 corresponding to the seams or shadows.

The method can further include the object ingestion engine selecting target shape object 224 from a set of shape objects, possibly based on a score as discussed previously. In the example shown, a sphere has a perimeter or silhouette that best matches the external boundary as represented by edges 222. Target shape object 224 can comprise additional information including shape geometrical attributes (e.g., radius), a name, type of symmetry (e.g., rotational symmetry, translation symmetry, reflection symmetry, helical symmetry, scale or fractal symmetry, etc.), relevant contexts, associated descriptors (e.g., edge descriptors), or other information. Of particular note, target shape object 224 includes one or more of reference key frame PoV 224A, which can be represented by a normal vector to a surface of target shape object 224.

During the process of selecting a target shape object 224 among the multiple candidate shape objects, the object ingestion engine 120 may determine that none of the candidate shape objects has a score that is high enough (below a certain pre-determined threshold of acceptability, low confidence match). As such, it is contemplated that the object ingestion engine 120 of some embodiments also include a user interface (e.g., a graphical user interface) that enables a user to provide input related to choosing a proper target shape object.

The object ingestion engine can also perform the step of generating object model 225 from the image data 221 associated with edges 222 and target shape object 224. At this point the object ingestion engine assigns actual values to the attributes from target shape object 224 to give rise to object model 225. Further the object ingestion engine performs the step of deriving a set of model key frame PoVs 226 from the PoV information associated with target shape object 224. This is illustrated by a number of arrows arranged in a circle. Model key frame PoVs 226 can be derived from the associated with the reference key frame PoV of target shape object 224. In the illustrated example, each model key frame PoV 226 can be derived based on symmetry, possibly based on descriptor density, or other factors.

The method further includes instantiating descriptor object model 227 from object model 225 where descriptor object model 227 comprises recognition algorithm descriptors having locations on object model 225 relative to the model key frame PoVs 226. It should be appreciated that derivation of the descriptors could occur before or after generation of model key frame PoVs 226. In the example, each PoV of descriptor object model 227 has been labeled for clarity as PoV A through PoV N thereby indicating any number of PoVs could be present.

The object ingestion module can further perform the step of creating a set of key frame bundles 228A through 228N, collectively referred to as key frame bundles 228. In some embodiments, a key frame bundle corresponds to at least one model key frame PoV 226. For example, the object ingestion engine might generate five key frame bundles from a possible 25 model key frame PoVs 226 because there is only sufficient image data 221 for five of the model key frame PoVs 226. Each key frame bundle 228 can include one or more pieces of recognition information that can be consumed by devices. Example recognition information can include, as discussed previously, image data, descriptors, normal vectors, metadata, context information, salient recognition algorithms, or other information.

The method can further include storing key frame bundles 228 in an object recognition database. Still further, content information (e.g., videos, promotions, text, applications, etc.) can be indexed within a content data store based on the recognition information from the key frame bundles 228. Consider a scenario within a hospital where a doctor captures MRI or ultrasound data of a patient's heart. The object ingestion engine builds key frame bundles based on the image data as discussed. The doctor indexes at least some of the patient's electronic medical records in a content data store, the hospital's database, based on the key frame bundle recognition information for future retrieval. Such an approach allows computing devices that consume key frame bundles 228 to recognize objects then identify which key frame bundles 228 are most relevant where the recognition information from the relevant key frame bundles 228 is used to retrieve or otherwise obtain the content information.

Figure 3:
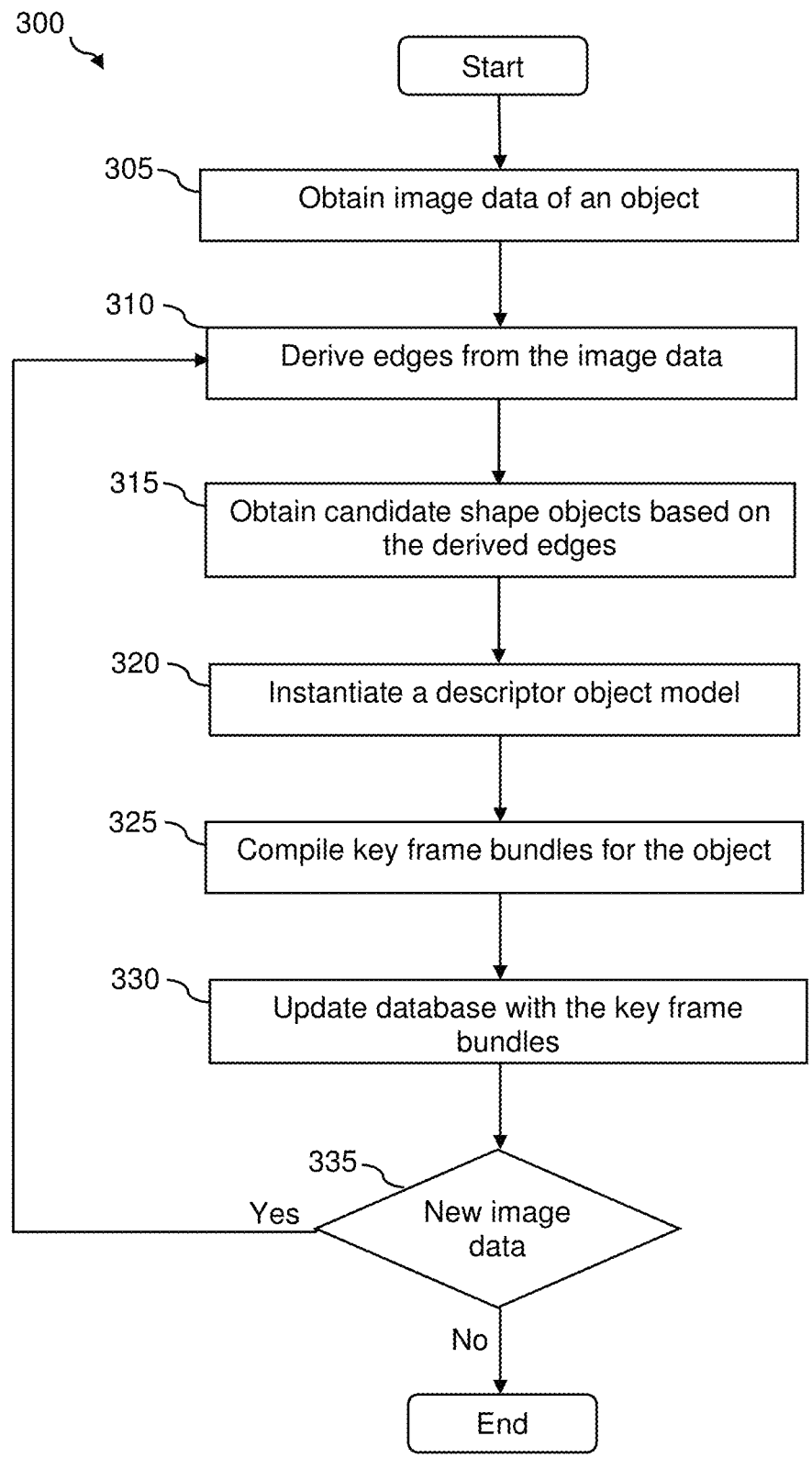
FIG. 3 illustrates a process of constructing the object recognition database using the object ingestion system of some embodiments.

FIG. 3 illustrates a process 300 of constructing an object recognition database by an object ingestion system of some embodiments. The process 300 begins by obtaining (at step 305) image data of an object. Preferably, the image data is obtained in an uncontrolled setting. The process 300 then derives (at step 310) edges and other edge-related data from the image data. The other edge-related data includes edgels, edgelets, constellations of edgelets, distances among the edgelets, etc. As mentioned above, the object ingestion system of some embodiments uses the edges and edge-related information to generate edge descriptors. Based on the edge descriptors, the process 300 obtains (at step 315) candidate shape objects from the canonical shape object database.

In some embodiments, the process 300 also select a target shape object from the candidate shape objects, where the target shape object has the optimal match with the target object represented by the image data. Using selecting a target shape object, the process 300 instantiate (at step 320) a descriptor object model and compiles (at step 325) key frame bundles for the object. In some embodiments, the process 300 textures and paints the target shape object based on the information extracted from the image data, and derive descriptors for the descriptor object model from the features of the shape object. In some embodiments, each key frame bundle corresponds to a different point of view from which one can analyze the object. The process 300 then updates (at step 330) the object recognition database with the newly compiled key frame bundles.

In some embodiments, the process 300 determines (at step 335) whether there is anymore image data to ingest. If there is more image data to ingest, the process 300 returns to step 310 and performs steps 310 through 330 again. In some embodiments, existing key frame bundles have been compiled for the object represented by the new image data. In these embodiments, instead of generating new key frame bundles, the process 300 can merely update the existing key frame bundles for the object.

The disclosed approach of biding reference PoVs with canonical shapes and then generating key frame bundles from model PoVs offers numerous advantages. On advantage includes construction of automated agents capable of mining existing video data or image data to populate object recognition database without human involvement. Further the system can observe changes in key frame bundle information over time while track objects in time varying content, possibly based on similar features (e.g., descriptors, edges, etc.). As objects are observed over time, the object's key frame bundles can be updated or refined with additional descriptor information or higher resolution images thereby improving performance of the resulting object recognition database.

Numerous additional considerations arise in view of the scope of the disclosed techniques. As an example, in an uncontrolled setting such as a grocery store, the object ingestion engine can identify numerous fungible products on the store shelves (e.g., cans, cereal boxes, etc.). Rather than ingesting each product individually the disclosed system can employ multiple optimizations. Once a first product, say a box of cereal, is ingested the system can create duplicates of the same box for all similar boxes recognized on the shelf. Although the duplicated boxes would have similar or even identical key frame bundles, the system can add additional metadata to the key frame bundles indicating a position on the store shelf for each individual box. Another optimization could include ingesting a single product, then using the initial modeled product as a template for subsequent similar products. Such an approach is advantageous because the model key frame PoVs would have already been established for the class of products and only the image data in the object models would have to be updated. Consider products having similar packaging and produced by single producer (e.g., Pringles® chips). The general shape, fonts, and logos on the products might be the same. However, the color and text might vary. Thus, an initially ingested can of Pringles original flavor would be leveraged as a template for other flavors. Still another example provides for optimizing or refining an object model based on numerous inputs from multiple products. Perhaps the image data from an initially ingested object is of poor quality (e.g., low resolution, poor scaling, poor lighting, etc.). Additional image data sets from identical objects can be averaged together or compiled to form a more detailed object model, which allow for generation of more complete or accurate key frame bundles.

Capturing image data in an uncontrolled or commodity setting can be quite problematic. The image data can include undesirable foreground object, occluding features (e.g., a person's hand, people, etc.) or other features. In view that the object ingestion engine binds shapes having reference key frame PoVs to edges, the ingestion engine has several options for dealing with problematic image data. As mentioned previously, the image data can be preprocessed in preparation for applying a recognition algorithm, possibly by applying a despeckle filter or converting the image to raw hue or grayscale. Further, occluding objects can be removed from the image data based on the edges and shape information. In additional, the model key frame PoVs can be derive for only the portions of the object model that lack occluding features.

Some embodiments could employ a form a Captcha, or other mechanical turk like interface, to improve reliability or accuracy of key frame bundles. Should the resulting object model lack sufficient clarity with respect to binding shape objects to image data, the object ingestion engine can request further alignment, placement or configuration information with respect to shape objects from a knowledge worker. Thus on aspect of the inventive subject matter is considered to include an object model validation module programmed to perform the step of interfacing to a user to validate, correct, modify, or otherwise assist in construction of key frame bundles.

Further optimizations can be employed to reduce generating unnecessary key frame bundles. For example, some classes of object will likely only be recognized from specific PoVs. Take a car for example. In a consumer setting, consumers might only require key frame bundles that correspond to the external side views of a car. Thus, a shape object that corresponds to a car template might include reference key frame PoVs having generation rules that apply only to the sides of car's model object. However, in a military or law enforcement setting, the car template shape object might heavily weight top view PoVs where such PoVs include rules for long distance perspectives when generating corresponding descriptors. Yet another military or customs related example could include having reference PoVs for the bottom of a vehicle so that inspectors can identify what should, or more interestingly what should not, be underneath a vehicle.

Disclosed object recognition ingestion system or engines have the capability of generating millions, or even billions, of key frame bundles associated with a vast array of ingested objects. However, not all key frame bundles will be of the same utility. As key frame bundles are consumed by devices in the field, the devices can provide metrics on which key frame bundles were most relevant when recognizing objects related to key frame bundles. The object recognition database or other managing system can use the metrics to rank, sort, or arrange, the key frame bundles in an appropriate manner. For example, the metrics combined with contextual information (e.g., location, time, user identify, weather, etc.) allow a recognition engine to determine which key frame bundles might be most relevant with respect to a specific circumstance. Further, the metrics can have applicability with respect to object ingestion. As statics are built, the metrics can weight how each reference key frame PoV should be used during the ingestion process. In addition, the metrics can influence the rules within the reference key frame PoVs that determine to generate model key frame PoVs. Example key frame bundle metrics can include number of uses by an individual or a collection of users, relative metric distance from actual observed descriptors, change or trends in key frame usage, context of use, or other statistic.

A number of very interesting use cases arise from an infrastructure that employs the inventive subject matter. As alluded to previously, object ingestion systems can provide highly useful services within respect to inventorying products within a store or market. An employee can capture image data with a commodity camera, or even a specialty camera, to capture images of products on shelves all of which can be ingested. Of particular note, subject to image data of sufficient quality, individual products could be distinguished from each other. For example, the employee might image a series of pumpkin pies in the bakery department. On the surface, one would assume all the pies are identical. However, the object ingestion engine can use one pie as a template for ingesting the remaining pies. The difference of one pie from another will be encoded in the key frame bundles, possibly as descriptor differences, based on relative locations to model key frame PoVs. These differences can then be used by an inventory system for tracking planograms, real-time inventory tracking, or for other product management purposes. Thus, the combination of shape objects having reference key frame bundles and differences among similar objects allows for tracking objects with specificity.

Toys can integrate the disclosed object ingestion system or services in a myriad of ways. Perhaps a Disney® princess doll operates as an ingestion engine where the doll ingests objects in a play environment; other dolls, other toys, children, parents, accessories, after market items, or other objects for example. As the doll ingests the objects, it can then recall which objects are familiar based on available key frame bundles. In some embodiments, the doll can couple with a local computer (e.g., family PC, game console, tablet, smart phone, etc.) that can operate as the object recognition database that stores all the key frame bundles. When the doll moves from one location to another, it can request key frame bundles having the most relevant PoVs for that location and based on the doll's perspective. Leveraging shape objects with reference PoVs allows the doll to ingest objects quickly, efficiently, and autonomously. Similar techniques can be applied to video games where a game console can ingest images of everyday objects or game players. The resulting key frame bundles can be distributed across other game systems to allow for interactive play. Further, a robotic system could take inventory of a store (e.g., grocery story, etc.) by ingesting objects from the shelves. This would not only provide information about recognizable products, but also support planogram management and virtual 3D store fronts.

Object ingestion engines can be coupled with live or recorded media streams as discussed previously. In some embodiments historical objects from old photographs or movies can be ingested for nostalgic, archiving, or research purposes. For example, old television shows or movies can be autonomously viewed by the object ingestion engine to create a database of known artifacts. Further, the object ingestion engine can view family photographs, family videos, security footage, or other sources to compile key frame bundles.

Yet another use case involves medical imaging. As medical images are ingested, the images can be mapped to canonical shape objects representing internal features of a body; organs, bones, teeth, brain, etc. Interestingly, each shape object could be used for different imaging modalities. A single heart shape object could be used to generate object models from MRI imaging data, ultrasound data, X-ray data, or other forms of imaging data. Further, the heart shape object can include reference PoVs that are contextually relevant to the type of imagining modalities. MRI imaging data might indicate that a $4\pi$ steradian set of PoVs would be useful, while X-ray might only require a single plane of PoVs. One should note that the key frame bundles from across modalities and from a single patient's body can be annotated with patient metadata thus allowing for retrieval of object information related to the patient at a later date. Clearly these techniques can be leveraged for diagnosis, health care, preventative care, prognosis, or other medical related activities.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. An object ingestion system, comprising:
at least one non-transitory computer readable memory storing executable object ingestion software instructions; and
at least one processor coupled with the at least one non-transitory computer readable memory that, upon execution of the object ingestion software instructions, performs operations to:
obtain a digital representation of a scene, wherein the digital representation is obtained from at least one sensor and further includes image data of at least one object and location information;
obtain a result set of shape objects from a canonical shape database, wherein the result set includes at least one shape object stored in the canonical shape database and that has at least one shape attribute satisfying selection criteria determined from geometrical information of the at least one object derived from the image data of the at least one object;
select at least one target shape object from the result set of shape objects based on a context associated with the at least one object;
instantiate at least one object model of the at least one object from the at least one target shape object and the image data; and
store, in an object recognition database, a bundle of recognition parameters derived from the object model and location information, wherein the recognition parameters enable a computing device to recognize the at least one object.

2. The system of claim 1, wherein the at least one shape object stored in the canonical shape database comprises a simple shape.

3. The system of claim 1, wherein the at least one shape object stored in the canonical shape database comprises a compound shape.

4. The system of claim 1, wherein the at least one shape object stored in the canonical shape database comprises a geometric primitive.

5. The system of claim 1, wherein the at least one shape object stored in the canonical shape database comprises an object template.

6. The system of claim 5, wherein the object template includes at least one of the following: a tree and a building.

7. The system of claim 5, wherein the object template includes at least one of the following: a car, a plane, a human, an appliance, and a toy.

8. The system of claim 1, wherein the location information comprises a GPS location.

9. The system of claim 1, wherein the location information comprises a location of the at least one object.

10. The system of claim 1, wherein the operations further include updating the object recognition database with new information related to the at least one object over time.

11. The system of claim 10, wherein the new information includes new image data integrated into the bundle of recognition parameters of the at least one object.

12. The system of claim 1, wherein the at least one object comprises a 3D object.

13. The system of claim 1, wherein the at least one object comprises at least one of the following: a landmark and a tourist attraction.

14. The system of claim 1, wherein the at least one shape object in the result set of shape Objects also satisfies the selection criteria based on the location information.

15. The system of claim 1, wherein the context includes at least one of: a location, a time, a temperature, a recognized object, and an orientation.

16. The system of claim 1, wherein the context comprises a positive association with respect to the location information.

17. The system of claim 1, wherein the context comprises a negative association with respect to the location information.

18. The system of claim 1, wherein the selection criteria depend. on edge descriptors derived from the image data.

19. The system of claim 1, wherein the computing device comprises at least one of: a game console and a smart phone.

20. The system of claim 11, wherein the recognition parameters include metadata comprising contextual recognition information.

21. The system of claim 20, wherein the contextual recognition information includes at least one of: a location, a time, a user identity, and a weather condition.

22. An object ingestion method comprising:
obtaining a digital representation of a scene, wherein the digital representation is obtained from at least one sensor and further includes image data of at least one object and location information;
obtaining a result set of shape objects from a canonical shape database, wherein the result set includes at least one shape object stored in the canonical shape database and that has at least one shape attribute satisfying selection criteria determined from geometrical information of the at least one object derived from the image data of the at least one object;
selecting at least one target shape object from the result set of shape objects based on a context associated with the at least one object;
instantiating at least one object model of the at least one object from the at least one target shape object and the image data; and
storing, in an object recognition database, a bundle of recognition parameters derived from the object model and location information, wherein the recognition parameters enable a computing device to recognize the at least one object.

23. A non-transitory computer readable medium storing one or more executable instructions for ingesting and recognizing one or more objects, which when executed by at least one processor coupled to the non-transitory computer readable medium perform:
obtaining a digital representation of a scene, wherein the digital representation is obtained from at least one sensor and further includes image data of at least one object and location information;
obtaining a result set of shape objects from a canonical shape database, wherein the result set includes at least one shape object stored in the canonical shape database and that has at least one shape attribute satisfying selection criteria determined from geometrical information of the at least one object derived from the image data of the at least one object;
selecting at least one target shape object from the result set of shape objects based on a context associated with the at least one object;
instantiating at least one object model of the at least one object from the at least one target shape object and the image data; and
storing, in an object recognition database, a bundle of recognition parameters derived from the object model and location information, wherein the recognition parameters enable a computing device to recognize the at least one object.

\* \* \* \* \*